United States Patent [19]

Holan et al.

[11] Patent Number: 4,815,338
[45] Date of Patent: Mar. 28, 1989

[54] SINGLE GEAR-PAIR VEHICLE DIFFERENTIAL

[76] Inventors: Robert J. Holan, 4508 52nd Street; Kelly D. Lindsey, 4513 51st Street, both of Drayton Valley, Alberta, Canada, T0E 0M0

[21] Appl. No.: 3,800

[22] Filed: Jan. 16, 1987

Related U.S. Application Data

[62] Division of Ser. No. 674,263, Nov. 23, 1984, Pat. No. 4,637,276.

[51] Int. Cl.$^4$ ............................................. F16H 1/38
[52] U.S. Cl. ...................................... 74/713; 74/710; 74/417
[58] Field of Search .............. 74/417, 423, 424, 710, 74/713, 665 GB

[56] References Cited

U.S. PATENT DOCUMENTS

| | | | |
|---|---|---|---|
| Re. 14,201 | 10/1916 | Niclausse | 74/713 |
| 109,114 | 11/1870 | Crouse | 74/417 |
| 353,793 | 12/1886 | Lloyd et al. | 74/713 |
| 432,982 | 7/1890 | Nicholas | 74/423 |
| 590,616 | 9/1897 | House | 74/417 |
| 600,482 | 3/1898 | Nichols | 74/417 X |
| 1,096,830 | 5/1914 | Deming | 74/710 |
| 1,234,241 | 7/1917 | Weiglet | 74/710 X |
| 1,262,562 | 4/1918 | Reiche | 74/710 X |
| 1,737,390 | 11/1929 | Roe | 74/710 |

Primary Examiner—Leslie A. Braun
Assistant Examiner—Dwight G. Diehl
Attorney, Agent, or Firm—William L. Chapin

[57] ABSTRACT

A differential for motor vehicles uses a crown or ring gear attached to a drive shaft to drive a single pinion gear attached to a first axle half shaft positioned at right angles to the drive shaft. In one embodiment, a second opposing axle half shaft is allowed to free wheel within the differential case. In a second embodiment, the opposing axle half shaft is slippably driven by the first axle half shaft by means of a clutch coupling the first and second axle half shafts.

In a third embodiment, first and second axle half shafts are rigidly coupled to one another.

3 Claims, 3 Drawing Sheets

SINGLE GEAR-PAIR VEHICLE DIFFERENTIAL

This application is a division of U.S. patent application Ser. No. 674,263 filed Nov. 23, 1984, now U.S. Pat. No. 4,637,276.

BACKGROUND OF THE INVENTION

1. Field Of The Invention

This invention relates to differential assemblies for use in motor vehicles. More particularly, it relates to differential assemblies having an input drive shaft coupling and two colinear, opposed half axles extending perpendicularly outward from the input drive shaft axis.

2. Description Of The Prior Art

Conventional vehicle differentials generally employ an input pinion gear coupled to the end of an input drive shaft which is rotated by the vehicle engine. In the conventional differential, the input pinion gear drives a crown or ring gear whose rotation axis is perpendicular to the rotation axis of the input pinion gear. The crown or ring gear is rotably mounted coaxially over the inner end of one half axle. One wheel of the vehicle is mounted to the outer end of the half axle. A second wheel and half axle are mounted at the opposite side of the vehicle.

A box-like structure differential housing or carrier referred to as the differential housing is mounted rigidly to the inner side of the crown or ring gear. The inner ends of both half axles extend inward through openings on opposite sides of the carrier, and are rotatably supported there within. Rigidly mounted to the ends of both half axles within the carrier are side bevel gears which face inward. The side gears are similar in appearance to the crown or ring gear, but smaller. Meshing at right angles with the pair of side gears are two opposed pairs of inwardly facing differential pinion gears which are rotatably mounted to the carrier. The axes of the two opposed pairs of differential pinion gears are perpendicular to one another and to the common axis of the half axles.

When a vehicle with a conventional differential as just described travels in a straight line, the crown or ring gear, differential carrier, side gears and attached half axles all rotate at the same angular velocity. In that situation, the differential pinion gears do not rotate around their own axes.

However, when the vehicle turns, the axle half shaft attached to the outward wheel turns faster than the axle half shaft attached to the inboard wheel. The accompanying relative rotational motion of the half shafts with respect to one another is permitted by the rotation of the differential side gears with respect to one another, and with respect to the differential carrier. This imparts a corresponding, opposed rotation couple to each pair of opposed differential pinions about their own axes. The rotation of coaxial differential pinion gears pairs relative to one another permits the two side bevel gears which mesh with the differential pinion gears and which are rigidly connected to the two axle half shafts to rotate with different speeds required for inboard and outboard wheels.

OBJECT OF THE INVENTION

An object of the present invention is to provide a vehicle differential design having fewer gears than existing designs, thereby providing a differential having potentially lower cost and weight.

Another object of the invention is to provide a vehicle differential which may be readily modified to a locked axle configuration.

Another object of the invention is to provide a vehicle differential providing limited slippage, i.e., relative rotation between axle half shafts driven through the differential.

Various other objects and advantages of the present invention, and its most novel features, will become apparent to those skilled in the art by a reading of the accompanying specification and claims.

It is to be understood that although the invention disclosed herein is fully capable of achieving the objects and providing the advantages mentioned, the structural and operational characteristics of the invention described herein are merely illustrative of the preferred embodiments. Accordingly, we do not intend the scope of our exclusive rights and privileges in the invention to be limited to the details of construction described. We do intend that reasonable equivalents, adaptations and modifications of the various embodiments and modifications of the present invention which are described herein are included within the scope of this invention as defined by the appended claims.

SUMMARY OF THE INVENTION

A vehicle differential according to the present invention uses a crown or ring gear as a drive gear fastened to an input drive shaft, rather than a pinion gear, which is used as the drive gear in a conventional differential. Also, the present invention uses a pinion gear positioned at right angles to the drive shaft ring gear, rather than a crown or ring gear, as the driven gear.

No differential carrier, differential pinion gears or differential side gears are used in the present invention. Instead, a first axle half shaft is rotatably mounted through one side of the differential case. The first axle half shaft is rotatably driven by a single pinion gear functioning as a side gear. The pinion gear is fastened to the inner end of the first axle half shaft, and is driven by the input ring gear.

A second, opposing axle half shaft is rotatably mounted through the opposite side of the differential case.

In one embodiment of the invention, the second opposing axle half shaft is allowed to free wheel within the differential case. In a second embodiment of the invention, the second axle half shaft is slippably driven by the first axle half shaft by means of a slip clutch coupling the inner ends of the first and second axle half shafts. In a third embodiment of the invention, the inner ends of the first and second axle half shafts are rigidly coupled together, allowing no relative rotation of the axle half shafts.

DESCRIPTION OF THE PREFERRED EMBODIMENTS

Figure 1:
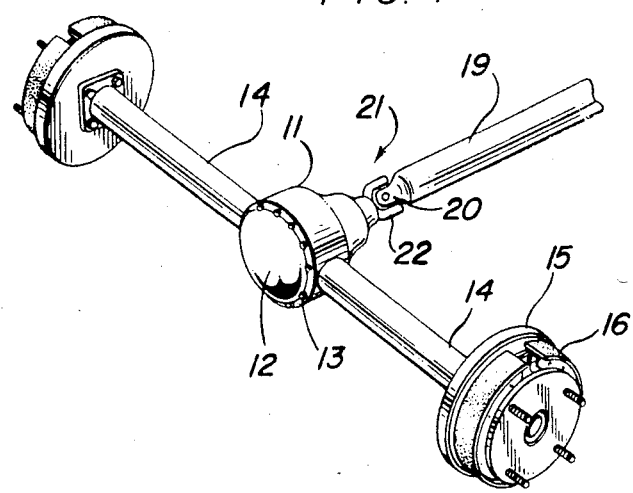
FIG. 1 is a top perspective view of the invention.
Figure 2:
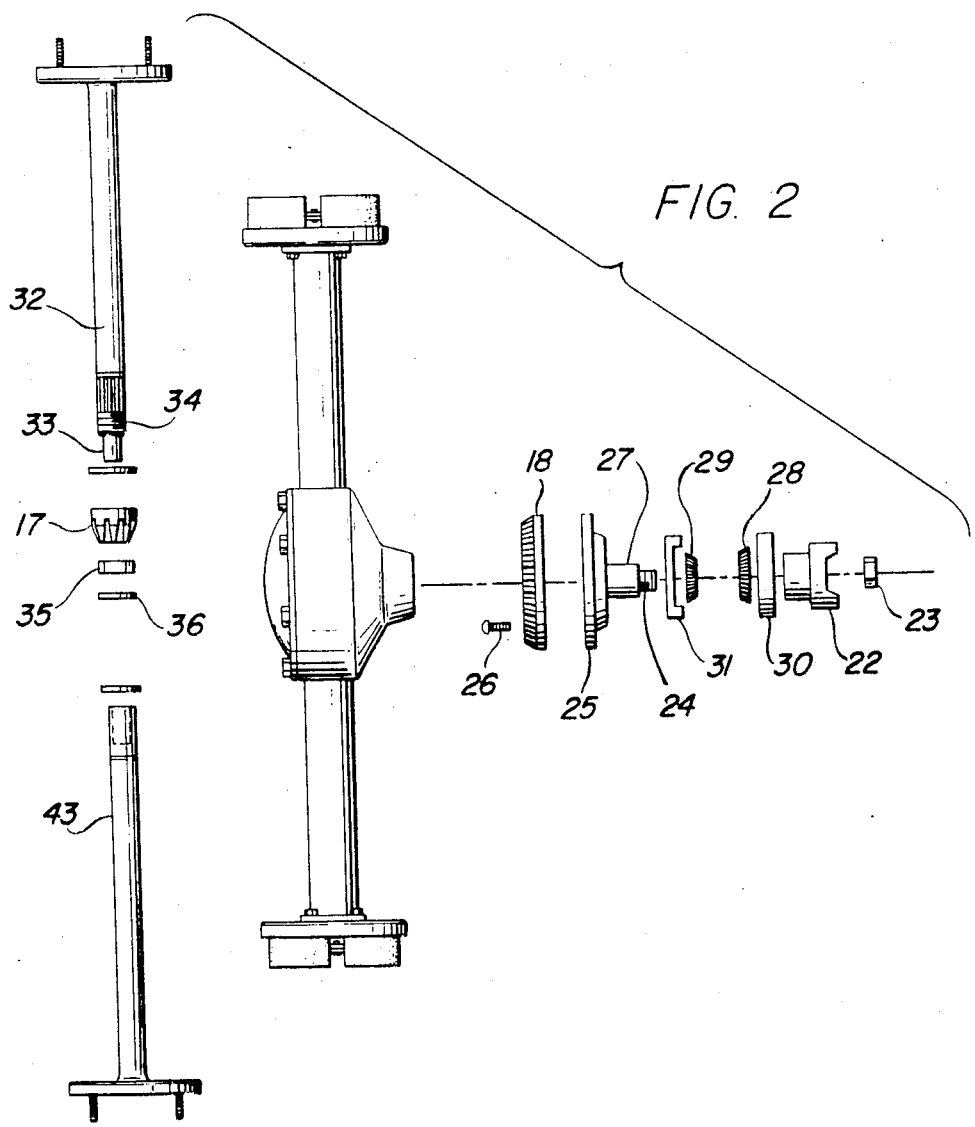
FIG. 2 is an exploded top plan view of the apparatus of FIG. 1.

Referring now to FIGS. 1 and 2, a vehicle differential constructed in accordance with the present invention is shown. A bulbous metal shell forms the front portion of the case for the differential. A more generally flat, disc-shaped rear cover plate 12 encloses the back portion of the differential and is secured to the differential case by bolts 13.

Tubular axle housing cylinders 14 extend outward from either side of differential case 11, and are rigidly fastened thereto. Wheel backing plates 15 and brake shoes 16 are shown fastened to the outer ends of each axle housing cylinder 14.

Figure 3:
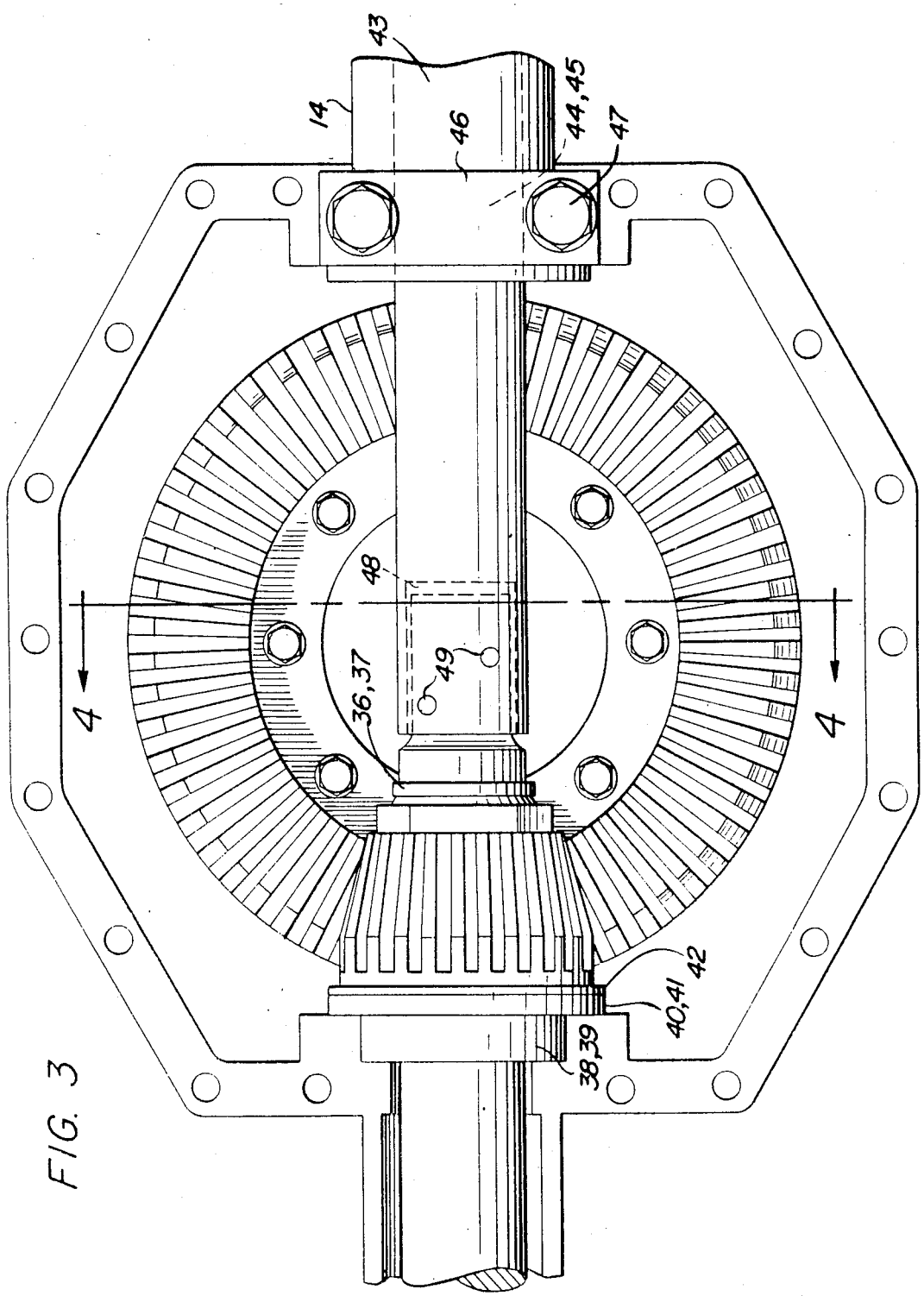
FIG. 3 is a fragmentary, partially sectional rear elevation view of the apparatus of FIG. 1.
Figure 4:
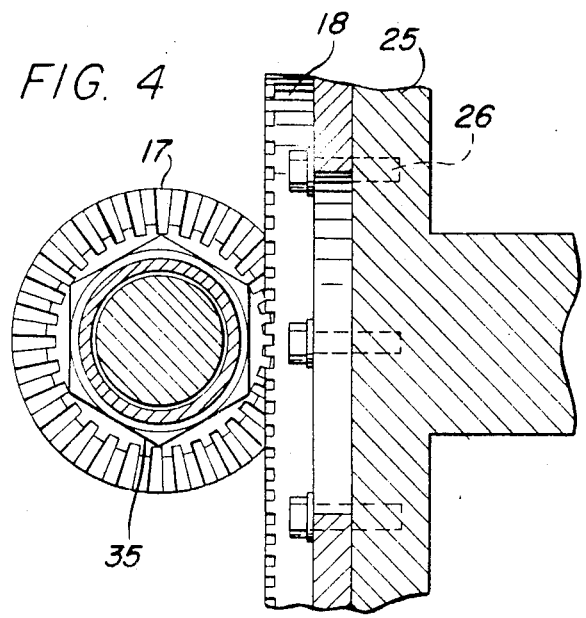
FIG. 4 is a sectional side elevation view of the apparatus of FIG. 1, taken along the line 4—4 in FIG. 3.

As may be seen best in FIGS. 1, 2 and 3, the conversion of input rotational power, about the longitudinal input axis of the differential, to rotational power about the axis of the axle, perpendicular to the longitudinal input axis, is accomplished primarily by driving side pinion gear 17 by input ring or crown gear 18.

Ring gear 18 is rotated by a conventional longitudinal drive shaft 19 as follows. Referring now to FIGS. 1 and 2, drive shaft 19, which is not part of the present invention, is coupled to front half 20 of universal joint 21, which is in turn pivotably connected to the rear yoke 22 of the universal joint. Rear yoke 22 is fastened with crown nut 23 to the threaded hub end 24 of crown gear backing plate 25. Crown or ring gear 18 is fastened to the back flat portion of crown gear backing plate 25 by means of bolts 26. The hub shaft 27 of backing plate 25 is rotatably mounted through an opening in the front portion of differential case 11 by means of opposed tapered roller bearings 28 and 29 rotating within bearing caps 39 and 31, respectively.

As may be seen best in FIG. 3, crown or ring gear 18 faces rearward into the interior of differential case 11 and meshes with side pinion gear 17 which is fastened to the inner end of left axle half shaft 32. Although side pinion gear 17 could be fastened to either one of the axle half shafts, according to present invention, it is shown fastened to the left axle half shaft 32 for purpose of illustration in the present example.

The inner end 33 of left half axle 32 is constricted to a smaller, uniform diameter section from the inner transverse face of the half axle some distance back from that face. Back some distance from the transition between the constricted diameter inner end 33 of left half axle 32 and the uniform diameter section extending outward towards the left wheel backing plate, the left half axle has an externally threaded section 34 disposed longitudinally some distance further back. Side pinion gear 17 is secured to threaded section 34 of half axle 32 by lock nut 35 tightened thereto. Safety snap ring 36 inserted transversely into annular groove 37 in half axle 32 between inner end 33 and threaded portion 34 of left half axle assures that lock nut 35 will not inadvertently loosen from threaded section 34.

Left half axle 32 is rotatably supported through an opening in the left side of differential case 11 by tapered roller bearing 38 rotating in bearing ring 39. Snap ring gear clip 40 inserted transversely into annular groove 41 in left half axle 32 inboard of bearing 38 and bearing ring 39 provides a backing support for gear shim 42. The longitudinal position of left side pinion gear 17 relative to the center of crown gear 18 is adjusted by selecting the thickness of gear shim 42. Gear shim 42 bears against the face of side pinion gear 17 and is maintained in position by snap ring gear clip 40.

As may be seen best in FIG. 3, right half axle 43 is rotatably supported through an opening in the right side of differential case 11 by tapered roller bearing 44 rotating in bearing ring 45. Bearing ring 45 and roller bearing 44 are secured to differential case 11 by means of bearing cap 46 and bolts 47.

In the basic embodiment of the invention, a cylindrical cavity 48 coaxial with the longitudinal axis of right half axle 43 extends back some distance from the inner face of the right half axle. Cavity 48 is of sufficient diameter to permit inner end 33 of left half axle 32 to rotate within the cavity without contacting right half axle 43. Alternatively, an annular bearing may be positioned between inner end 33 and cavity 48. Holes 49 through the wall of cylindrical end cavity 48 permit lubricant contained within differential housing 11 to pass into the region between inner end 33 and cavity 48. Thus, in the basic embodiment of the invention, one half axle (the left half axle 32 in this example) is driven, while the other half axle (the right half axle 43 in this example) is permitted to free wheel. Therefore, when a vehicle equipped with a differential according to the present invention executes a left turning motion, right half axle 43 and the wheel attached to its outer end are free to rotate at the larger rotation speed required for an outboard wheel. Conversely, when the vehicle executes a right turning motion, the right half axle and wheel are free to rotate at the smaller rotation speed required for an inboard wheel.

Figure 5:
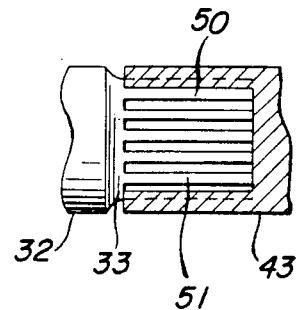
FIG. 5 is a fragmentary, partial sectional elevation view of a second embodiment of the apparatus shown in FIG. 1.

An alternate embodiment of the invention generally in conformance with the structure illustrated in FIGS. 1 through 4 is shown in FIG. 5. In the alternate embodiment shown in FIG. 5, the interior of cylindrical end cavity 48 of right half axle 43 is provided with internal splines 50. End 33 of left half axle 32 is provided with external splines 51 which permit end 33 to slide freely into cavity 48 during assembly of the differential. However, splines 50 and 51 mesh with one another to prevent relative rotation of left half axle 32 and right half axle 43. Thus, in this embodiment, left rear half axle 32 and right half axle 43 are rigidly locked together and constrained to turn at the same rotation speeds. This locked rear axle configuration is useful for such applications as drag racing.

Figure 6:
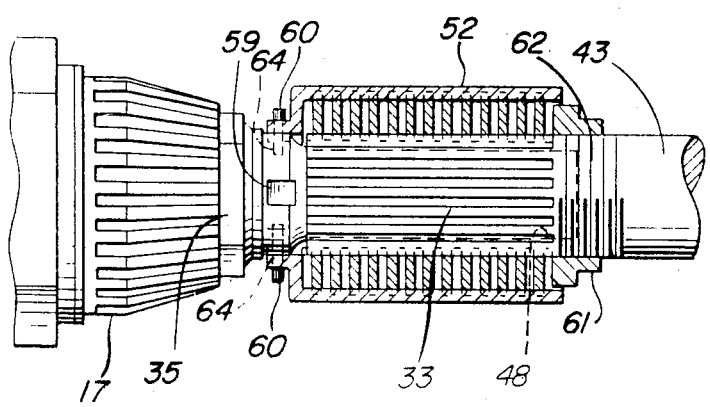
FIG. 6 is a fragmentary, partially sectional rear elevation view of a third embodiment of the apparatus shown in FIG. 1.
Figure 7:
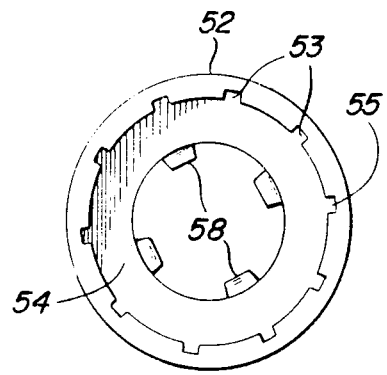
FIG. 7 is a sectional side elevation view of the apparatus of FIG. 6, taken along line 7—7 in FIG. 6.
Figure 8:
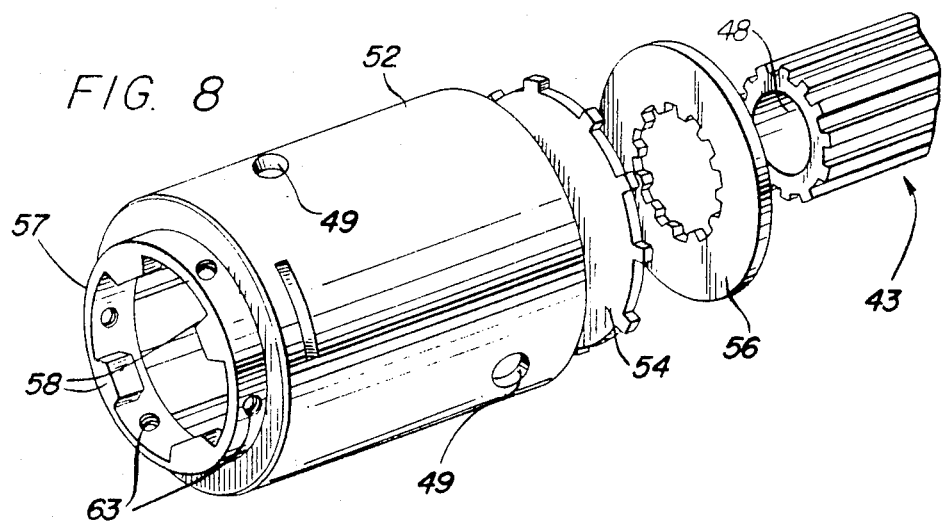
FIG. 8 is an exploded view of the clutch disc and plate assembly of FIGS. 6 and 7.

In a third embodiment of the invention, shown in FIGS. 6, 7 and 8, a slip clutch is used to slippably couple rotary motion from the left half axle to the right half axle.

As shown in FIGS. 6 and 7, the inner end of right half axle 43 is modified from the right half axle used in the basic embodiment of the invention by the addition of a hollow cylindrical clutch housing 52 fastened to the inner end of left half axle 32 just inboard of the point where the left half axle protrudes into the interior of differential case 11. Clutch housing 52 is coaxial with the longitudinal axis of left half axle 32, and extends inward some distance towards the center of differential case 11. The walls of clutch housing 52 contain a plurality of rectangular cross-section, elongated slots 53 disposed longitudinally parallel to the longitudinal, cylindrical axis of clutch housing 52. A plurality of identical uniformly spaced clutch driving plates in the shape of annular rings 54 are held captive within slots 53 of clutch housing 52, as will be described below. Clutch driving plates 54 are disposed in parallel alignment along and perpendicular to the longitudinal axis of clutch housing 52. Clutch driving plates 54 are fabricated from thin, uniform cross section metal sheet stock.

Each clutch driving plate 54 is provided with a plurality of integral rectangular tabs 55 which extend radially outward from the outer circumferential edge of each plate. Tabs 55 protrude into corresponding slots 53 in clutch housing 52, thereby being driven rotationally by clutch housing 52.

Clutch driving plates 54 slippably drive clutch friction plates 56, as will be described below. As shown in FIGS. 6 and 7, clutch friction plates 56 are flat, annular shaped discs which are internally splined. Friction plates 56 are disposed along the externally splined inner end of right half axle 43, between pairs of clutch driving plates 54. The mesh between the externally splined surface of right half axle 43 and internally splined surfaces of clutch friction plates 56 forces right half axle 43 to rotate at the same rate as friction plates 56.

The inner end of clutch housing 52 has an integral cup-shaped member 57 coaxial with the longitudinal axis of the housing, and extending outward therefrom. An outward facing opening in cup-shaped member 57 is slid over end 33 of left half axle 32 during assembly of the differential. Cup-shaped member is secured rotationally to end of left half axle 32 by means of radially inward projecting splines 58 on member 57 meshing with corresponding slots 59 on left half axle end 33, as shown in FIG. 6. Cup-shaped member 57 and attached clutch housing 52 are secured longitudinally to left half axle 32 by a plurality of countersunk Allen screws 60 screwed through holes 63 in cup-shaped member 57 and holes 64 in left half axle 32.

Clutch friction plates 56 are caused to be frictionally driven by clutch driver plates 54 by tightening internally threaded clutch adjusting collar 61 over threaded portion 62 of right half axle 43 down onto the outermost clutch driver plate 54. Facing surfaces of clutch friction plates 56 and clutch driver plates 54 are laminated with thin sheets of paper or similar material which provides a relatively high coefficient of friction. The pressure applied to outermost clutch driver plate 54 forces mating surfaces of clutch driver plates 54 and clutch friction plates 56 to frictionally contact one another. Thus, when left half axle 32 is rotatably driven, clutch housing 52, which is rigidly fastened to inner end 33 of left half axle 32 also rotates, along with clutch driver plates 54 rigidly attached to the interior of the clutch housing. The pressure produced on the mating surfaces of clutch driver plates 54 and clutch friction plates 56 by clutch collar 61 causes friction plates 56 to rotate at the same speed as driver plates 54. Also, the engagement of splines of friction plates 56 in slots of right half axle 43 causes right half axle to rotate along with friction plates 56, and hence at the same speed as left half axle 32. Accordingly, when a vehicle equipped with a differential according to this embodiment of the present invention travels in a straight line both left and rear half axles turn at the same speed, and vehicle locomotion power is applied to both left and rear half axles. When the vehicle executes a right turn, left half axle 32 must rotate faster than right half axle 43, since the outboard wheel of the vehicle and hence the half axle attached to it must rotate faster than the inboard wheel and axle. Slippage between clutch driving plates 54 and clutch friction plates 56 allows left half axle 32 and driving plates 54 to rotate faster than driven friction plates 56 and right half axle 43. Conversely, when the vehicle executes a left turning motion, the left half axle and wheel and clutch driving plates 54 are permitted to rotate at a slower rate than right half axle 43 and driven friction plates 56, owing to the slippage between clutch driving plates 54 and driven friction plates 56.

What is claimed is:

1. An apparatus for transforming rotary power conveyable into said apparatus by a drive shaft to rotary traction power to at least one wheel of the vehicle comprising:
   a. a ring gear having a forward protruding hub adapted to rigidly couple to an input drive shaft,
   b. a beveled gear having longitudinally disposed teeth adapted to mesh with teeth of said ring gear, said teeth of said ring gear being located rearward of said ring gear hub,
   c. a first half axle rigidity coupled to said beveled gear,
   d. a second half axis colinear with said first half axle, said second half axle containing a blind cylindrical cavity having an opening sufficiently large to permit the inner end of said first half axle to rotate freely within said cylindrical cavity, said inner end of said first half axle fitting within said cavity and being supported by said second half axle, said beveled gear being mounted coaxially over said first half axle, back some distance from that inner end of said first half axle adjacent the inner end of said second half axle,
   e. means for rotatably supporting said ring gear and said first and second half axles comprising a bulbous shaped housing having a front opening and coaxial bearing assembly for rotatably supporting said hub of said ring gear, and first and second colinear side openings symmetrically disposed on either side of said housing, each of said side openings having a coaxial bearing assembly for rotatably supporting said first and second half axles, respectively, and means for rigidly coupling said beveled gear to said first half axle comprising in combination,
   (i) an externally threaded longitudinal section on said first half axle, said threaded section being located longitudinally outwards of said inner end of said first half axle rotatably disposed within the inner end of said second half axle,
   (ii) an annular groove in the outer cylindrical wall of said first half axle longitudinally outwards of said externally threaded section of said first half axle, said groove being located longitudinally adjacent an inner annular face of said coaxial bearing assembly rotatably supporting said first half axle,
   (iii) a generally annular lock ring lockingly engageable in said annular groove, and
   (iv) an internally threaded nut tightenable on said externally threaded section of said first half axle to apply an outward longitudinal force on the inner annular face of said beveled gear, thereby forcing the outer annular face of said beveled gear against the inner annular face of said annular lock ring, and thereby minimizing potential longitudinal movement of said first half axle relative to said housing and said coaxial bearing assembly.

2. The apparatus of claim 1 further including a flat annular shim coaxially encircling said first half axle, said shim being located longitudinally between the inner annular face of said annular lock ring and the outer annular face of said bevelled gear, said shim being of thickness selected to maintain said bevelled gear in a desired longitudinal position.

3. The apparatus of claim 2 further including a second annular groove in the outer cylindrical wall of said first half axle inwards of said externally threaded section of said first half axle, said groove being adapted to receive a generally annular locking ring to secure said threaded nut against inward longitudinal movement relative to said first half axle.

* * * * *